US007661743B2

(12) United States Patent
Williamson et al.

(10) Patent No.: US 7,661,743 B2
(45) Date of Patent: Feb. 16, 2010

(54) BEZEL RETAINER CLIP

(75) Inventors: Andrea G. Williamson, Shelby Township, MI (US); Jennifer A. Rosenquist, Eastpoint, MI (US); Scott A. Niemiec, West Bloomfield, MI (US); Gale L. Blair, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 561 days.

(21) Appl. No.: 11/539,877

(22) Filed: Oct. 10, 2006

(65) Prior Publication Data

US 2007/0131003 A1 Jun. 14, 2007

Related U.S. Application Data

(60) Provisional application No. 60/725,826, filed on Oct. 12, 2005.

(51) Int. Cl.
*B60J 1/18* (2006.01)

(52) U.S. Cl. .................... 296/50; 296/146.1; 296/146.5

(58) Field of Classification Search ................... 296/50, 296/56, 57.1, 146.1, 152, 146.5, 146.8, 1.02, 296/1.07, 1.08; 292/DIG. 3, 31, 43; 70/208; 16/412
See application file for complete search history.

(56) References Cited

U.S. PATENT DOCUMENTS 5,226,259 A * 7/1993 Yamagata et al. ............. 49/502
5,282,657 A * 2/1994 Clinch et al. ............. 292/336.3
5,377,450 A * 1/1995 Varajon ........................ 49/502
5,882,053 A * 3/1999 Bekins et al. ............ 292/336.3
5,904,002 A * 5/1999 Emerling et al. .............. 49/502
5,987,943 A * 11/1999 Verga et al. .................... 70/208
6,059,329 A * 5/2000 Spitzley ................... 292/336.3
6,209,366 B1 * 4/2001 Zagoroff ....................... 70/208
6,371,549 B2 * 4/2002 Kim ........................ 296/146.8
6,427,502 B1 * 8/2002 Zagoroff ....................... 70/208
6,490,895 B1 * 12/2002 Weinerman et al. ........... 70/208
6,513,354 B2 * 2/2003 Predd et al. .................... 70/208
6,546,674 B1 * 4/2003 Emerling et al. .............. 49/502
6,886,874 B2 * 5/2005 Abe .......................... 296/1.08
7,036,877 B2 * 5/2006 Schultz et al. ............. 296/214
7,454,933 B1 * 11/2008 Paige et al. ................... 70/208

* cited by examiner

*Primary Examiner*—Glenn Dayoan
*Assistant Examiner*—Gregory Blankenship

(57) ABSTRACT

The invention concerns a vehicle having a closure with a handle surrounded by a handle bezel, and a method of assembling the handle bezel to the closure. The handle bezel, which may contain a key cylinder, mounts around the handle and includes a retainer bracket having a retaining clip. The retaining clip includes fastener retention tabs that engage with a fastener extending from an inner surface of the closure. The fastener retention tabs allow the handle bezel to be installed from the outer surface of the closure without requiring extra fastener installation. But the handle bezel cannot be removed from the closure without access to the inner surface of the closure.

20 Claims, 3 Drawing Sheets

BEZEL RETAINER CLIP

CROSS-REFERENCE TO RELATED APPLICATIONS

This application claims the benefit of U.S. Provisional Application No. 60/725,826, filed Oct. 12, 2005, which is incorporated herein by reference.

BACKGROUND OF INVENTION

The present invention relates generally to a retainer clip, and in particular to a retainer clip for use with a handle bezel on a vehicle closure and a method of installing the handle bezel.

In many conventional automotive vehicles, at least one of the passenger doors has a handle bezel with an opening for inserting a key into a key cylinder in order to unlock the door latch. This is also true for the lift gates and similar cargo closures on station wagons, sport utility vehicles and vans. In addition, the key cylinder on the rear openings are generally keyed to unlock with the same key as the passenger doors.

The end gates (also called lift gates) of conventional pickup trucks, on the other hand, did not include locks. More recently, however, end gates in some pickup trucks have added a lock cylinder for locking the end gate latch. The addition of a lock cylinder adds extra steps in the assembly process since now a key cylinder needs to be assembled to the handle bezel of the end gate before the bezel is mounted to the end gate. Moreover, the additional key cylinder for the end gate is preferably brought to the vehicle at the same time as the key cylinder for the passenger door(s) in order to assure that a matched set (a set that will use the same key) is assembled to each vehicle. An extra assembly station in the assembly plant can be added to accomplish these tasks, but this can be undesirable from both a cost and an assembly process standpoint. The matched key cylinders can also be tracked separately in the plant, but this is generally undesirable from both a cost and assembly process standpoint.

Some end gates on pickup trucks include an access panel on the inner surface adjacent to the latch handle, providing access to a securing means within the end gate for the handle assembly as well as the handle bezel and lock cylinder. This may allow for assembly at a single station. However, not all end gates include such an access panel, and this may not always eliminate the need for another assembly station.

Another option is to provide a fastener that will secure the handle bezel on the outer surface of the end gate by extending through the bezel and engaging the end gate. This is not only less aesthetically attractive, but this would somewhat defeat the purpose for adding a lock on the end gate in the first place since one may be able to defeat the lock by unscrewing the fastener and removing the handle bezel to unlatch the end gate.

Thus, it is desirable to have some means on the inner surface of the end gate to allow one to release the handle bezel when needing repair, while preventing the bezel from being released and removed from the outer surface of the end gate. Preferably, this is accomplished while still allowing for flexibility in the timing and station at which the handle bezel is installed on the end gate in the assembly plant.

SUMMARY OF INVENTION

An embodiment contemplates a handle bezel for use on a closure of a vehicle. The handle bezel may include a bezel body having an opening adapted to receive a handle; a retainer bracket extending outward from the bezel body and including a support flange; and a retainer clip mounted to the retainer bracket and including a main surface having a fastener opening extending therethrough, and a plurality of fastener retention tabs extending generally radially inward into the fastener opening and extending out of plane to the main surface, with the plurality of fastener retention tabs adapted to slidably engage a fastener mounted to the closure when the handle bezel is biased toward the closure and securingly engage the fastener mounted to the closure when the handle bezel is biased away from the closure.

An embodiment contemplates a closure of a vehicle. The closure of the vehicle may have an outer surface including a handle opening, and an inner surface in opposed relation to the outer surface. A latch handle assembly is located within the handle opening, has a handle portion, and is secured to the inner surface. A fastener extends through the inner surface toward the outer surface. The closure may also have a handle bezel including a bezel body having an opening that receives the handle portion; a retainer bracket extending outward from the bezel body; and a retainer clip mounted to the retainer bracket and including a main surface having a fastener opening extending therethrough, and a plurality of fastener retention tabs extending generally radially inward into the fastener opening and extending out of plane to the main surface, with the fastener retention tabs slidably engaging the fastener when the handle bezel is biased toward the closure and securingly engaging the fastener when the handle bezel is biased away from the closure.

An embodiment contemplates a method of assembling a handle bezel to a vehicle closure having an outer surface and an inner surface, the method comprising the steps of: assembling a latch handle assembly to the vehicle closure with at least one fastener extending through the inner surface and extending toward the outer surface; slidably inserting a handle bezel through a handle opening in the outer surface around a handle portion of the latch handle assembly; slidably engaging a retainer clip mounted to the handle bezel around the fastener as the handle bezel is axially moved toward the outer surface; and engaging fastener retention tabs on the fastener such that axially sliding disengagement of the retainer clip from the fastener is prevented.

An advantage of an embodiment is the flexibility provided in determining when and where, in an assembly plant, the handle bezel is assembled to the end gate (closure). This may reduce costs by avoiding the need to separately sequence the assembly of the end gate key cylinder, eliminating the need to install a separate fastener specifically for the purpose of securing the handle bezel to the end gate, and/or eliminating the need for a separate assembly station.

An advantage of an embodiment is that the key cylinder can be installed to the handle bezel and then located with the vehicle for later assembly in order to assure that the end gate key cylinder is matched to a passenger door key cylinder. The handle bezel (with key cylinder) can then be assembly to the end gate at the most advantageous location in the assembly process.

An advantage of an embodiment is that the handle bezel and key cylinder require access to the inner surface of the end gate in order to be removed, thus maintaining the theft deterrence function while still allowing for repair and replacement of the handle bezel and key cylinder.

DETAILED DESCRIPTION

Figure 1:
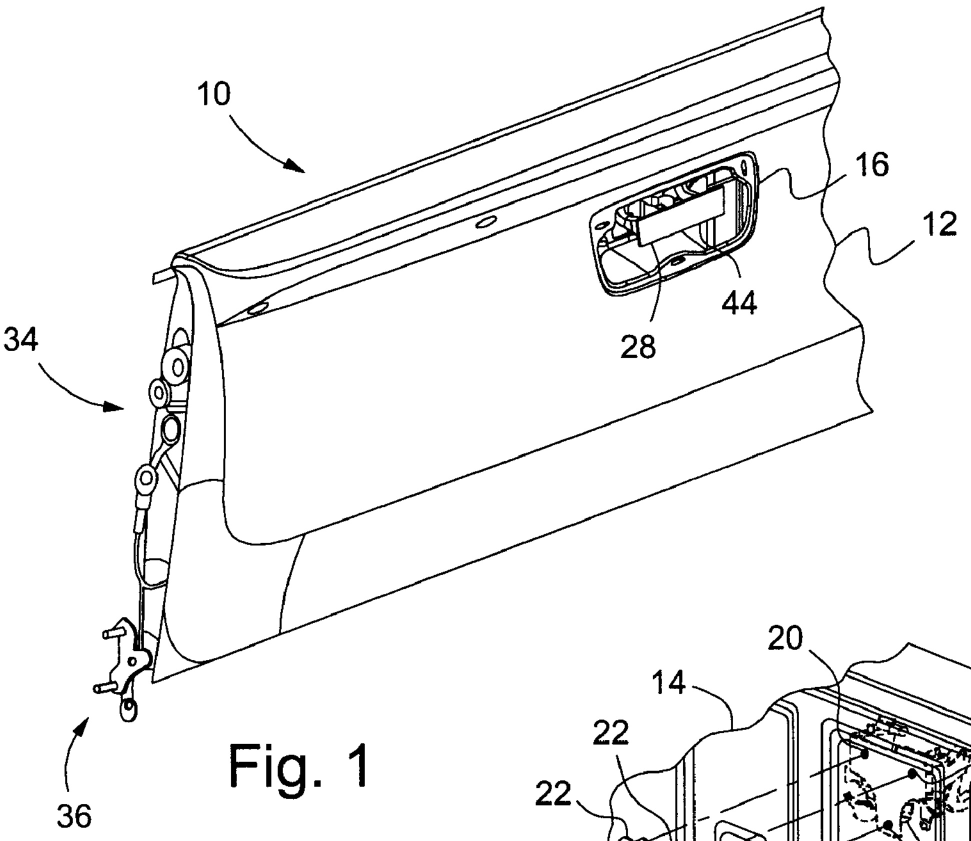
FIG. 1 is a perspective view of a portion of an end gate of an automotive vehicle.
Figure 2:
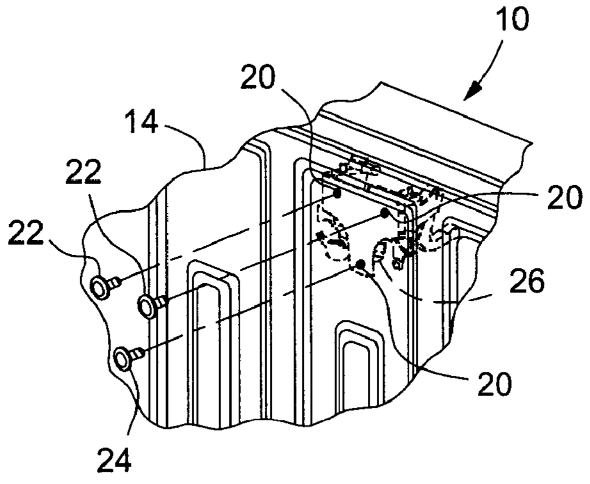
FIG. 2 is a partially exploded, perspective view, on an enlarged scale, of a portion of an inner surface of the end gate of FIG. 1.
Figure 4:
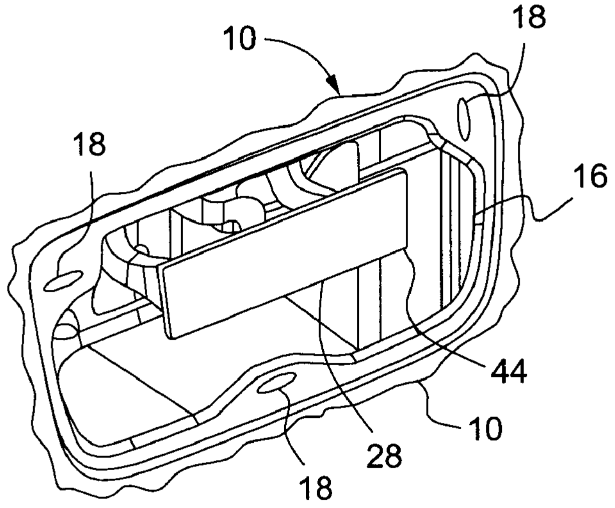
FIG. 4 is a perspective view, on an enlarged scale, of a portion of an outer surface of the end gate of FIG. 1.
Figure 3:
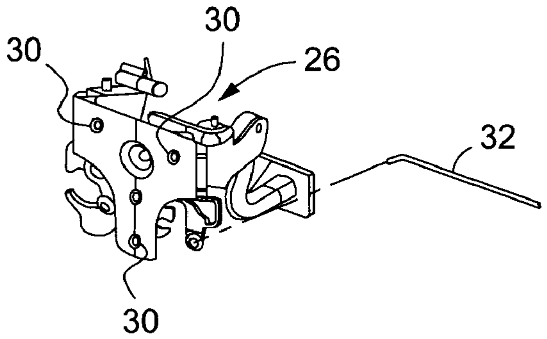
FIG. 3 is a perspective view, on an enlarged scale, of a portion of a latch assembly of the end gate of FIG. 1.
Figure 5:
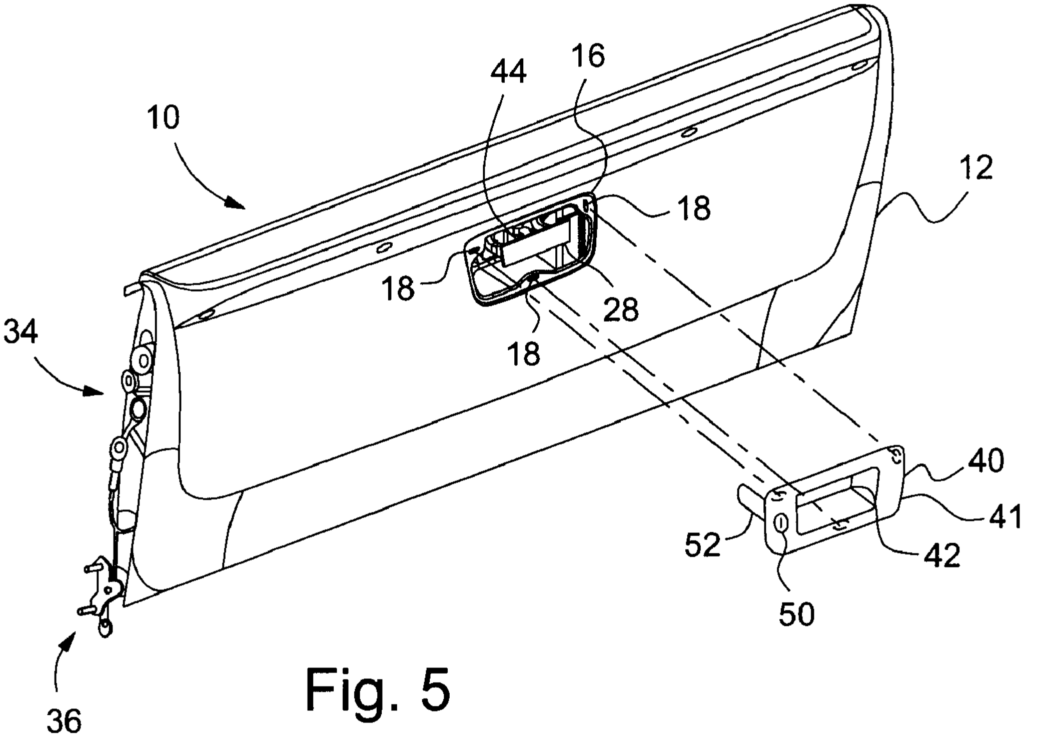
FIG. 5 is a partially exploded, schematic, perspective view of the end gate and handle bezel.
Figure 6:
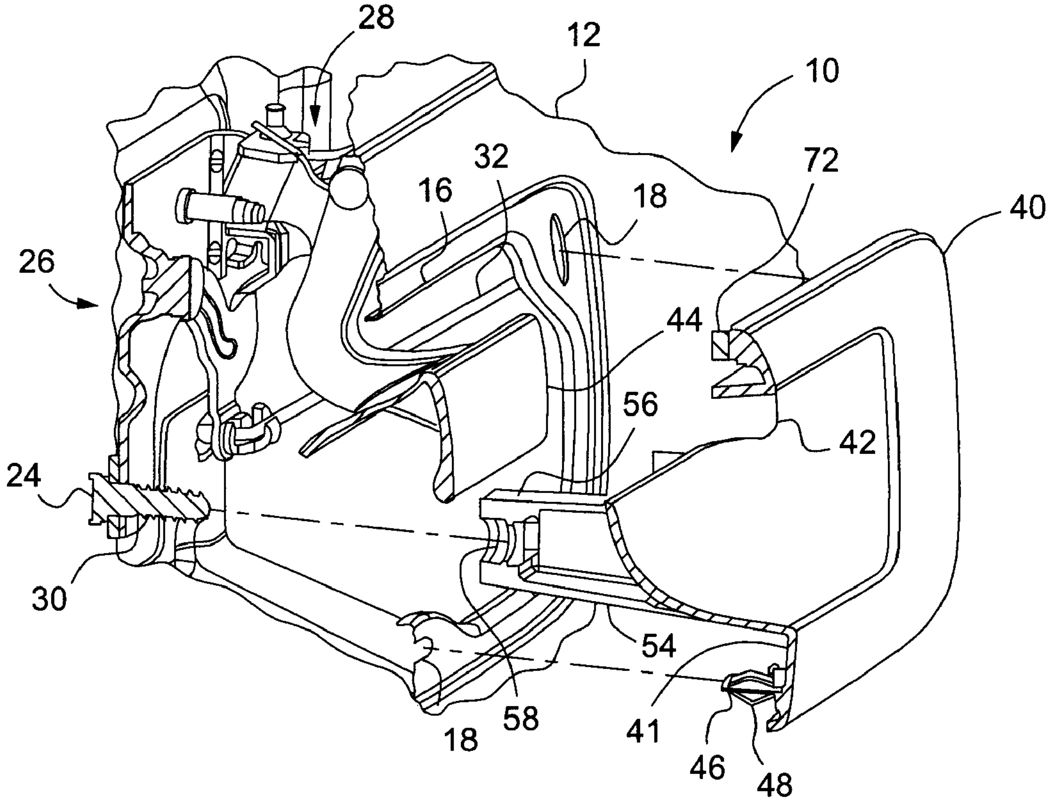
FIG. 6 is a partially exploded, perspective view, on an enlarged scale, of the latch handle assembly and handle bezel of the end gate of FIG. 5.
Figure 7:
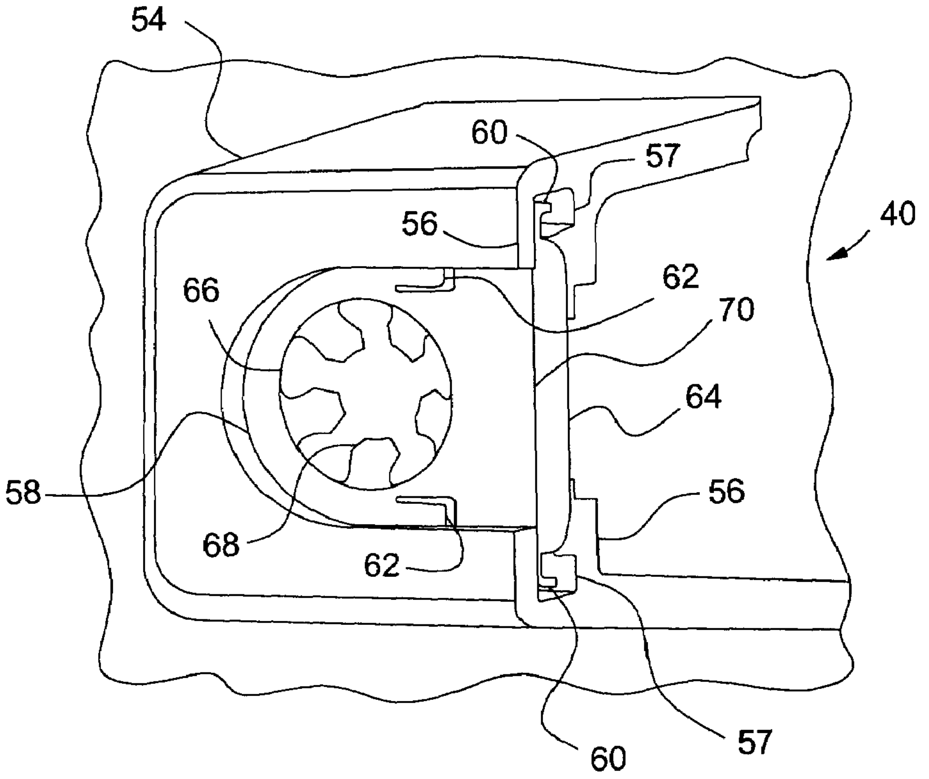
FIG. 7 is a perspective view of a bracket portion and retainer clip of the handle bezel.
Figure 8:
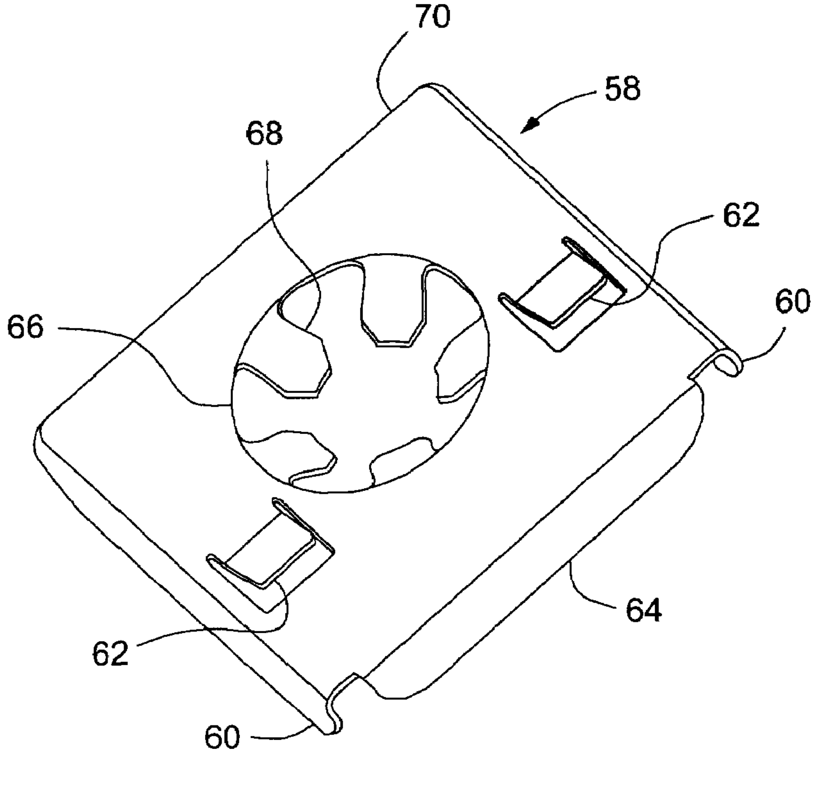
FIG. 8 is a perspective view, on an enlarged scale, of the retainer clip of FIG. 7.

FIGS. 1-8 illustrate a vehicle end gate (tail gate), indicated generally at 10, and portions thereof, in accordance with the present invention. The end gate 10 has an outer surface 12 that faces in an aft direction of the vehicle (not shown) and an inner surface 14 that faces in a forward direction of the vehicle. The inner surface 14 may be, for example, at a rear of and facing into a cargo box (not shown) of a pickup truck, when the end gate 10 is in its closed (vertical) position.

The outer surface 12 includes a handle opening 16, around which are located three tab slots 18. The inner surface 14 includes three fastener holes 20 opposite the handle opening 16. The upper two of the three fastener holes 20 receive a pair of top fasteners 22, while the lower of the three fastener holes 20 receives a bottom fastener 24. The fasteners may be, for example, bolts or screws.

A latch assembly 26 assembles into a latch handle assembly 28. The latch handle assembly 28 may be assembled to the end gate 10 by inserting the latch handle assembly 28 into the handle opening 16, connecting the latch handle assembly 28 to latch rods 32, and then securing the latch assembly 26 to the end gate 10 by inserting the fasteners 22, 24 through the fastener holes 20 and screwing them into fastener holes 30 in the latch assembly 26. The latch rods 32 may engage catches 34 (only left side shown) that operatively engage the vehicle to hold the end gate 10 in its closed position. The catches 34 are selectively releasable by the latch handle assembly 28 to allow the end gate 10 to pivot about hinges 36 (only left side shown) into an open (horizontal) position.

A handle bezel 40 includes main body 41 with a handle opening 42 for receiving the handle portion 44 of the latch handle assembly 28 therethrough. The handle bezel 40 can be installed immediately after or during installation of the latch handle assembly 28, or at a later time. The handle bezel 40 has three integral tabs 46 extending from the main body 41 that are located to align with and slide into the tab slots 18 when the handle bezel 40 is in the correct location and orientation relative to the handle opening 16. Each of the integral tabs 46 may include a retention spring 48 mounted thereon to provide a biasing force to help retain the integral tabs 46 in their respective tab slots 18.

The handle bezel 40 also includes a mount 50 for mounting a key cylinder 52 thereto. The key cylinder 52 engages with the latch handle assembly 28 to lock and unlock the assembly based on which direction a key (not shown) is turned in the key cylinder 52. The key cylinder and its engagement with the latch handle assembly 28 may be conventional, if so desired, and so will not be discussed or shown in more detail herein.

In addition, the handle bezel 40 includes a retainer bracket 54 extending from the main body 41. The retainer bracket 54 is located to align with—and has support flanges 56 that are located to extend partially around—the bottom fastener 24 when the handle bezel 40 is mounted to the end gate 10. A retainer clip 58 mounts in the retainer bracket 54. It has mounting flanges 60 that are received in slots 57 of and supported by the support flanges 56. A pair of bracket retention tabs 62 extend from the retainer clip 58 and engage with the slots 57 to prevent the retainer clip 58 from sliding out of the support flanges 56. A stiffening flange 64 extends from the retainer clip 58 and is located between the slots 57. The stiffening flange 64 helps minimize the flexing of the retainer bracket 54 when out of plane forces are applied to the bracket 54.

The retainer clip 58 also includes a fastener opening 66 in a main surface 70, with fastener retention tabs 68 extending radially inward toward the center of the opening 66. The fastener retention tabs 68 are angled out of plane from the main surface 70. The fastener retention tabs 68 are oriented to extend radially inward and aft when the handle bezel 40 is mounted in the end gate 10, with the fastener retention tabs 68 extending radially inward far enough to engage with threads on the bottom fastener 24.

Assembly of the handle bezel 40 to the end gate 10 may include assembling the key cylinder 52 to the handle bezel 40 at the same time as a key cylinder (not shown) for a passenger door (not shown) is installed in that door so that the key cylinders will unlock with the same key (not shown). The handle bezel 40 for the end gate 10 may then be kept with the vehicle until such time as it is desirable to install the handle bezel 40 to the end gate 10. Of course, other sequencing may be employed in the assembly plant instead, if so desired.

The handle bezel 40 is assembled to the end gate 10 by aligning each integral tab 46 with its corresponding tab slot 18 and pushing it into position. While pushing it into position, the retention springs 48 on the integral tabs 46 will each engage with its corresponding tab slot 18, and the retainer clip 58 will slide over the bottom fastener 24, with the fastener retention tabs 68 engaging the threads of the bottom fastener 24. The bottom fastener 24 will already have been installed previously while securing the latch assembly 26 to the end gate 10.

The retainer clip 58 on the retainer bracket 54 of the handle bezel 40, then, allows one to assemble the handle bezel 40 to the end gate 10 without having to lower the end gate 10, and without having to add—or remove and reinstall—any additional fasteners to secure it in place. Accordingly, once the vehicle reaches a final trim station in an assembly plant, for example, the handle bezel 40 can be assembled to the end gate 10, even though a lock cylinder for a passenger door and the latch handle assembly 28 have been installed at previous stations in the assembly plant.

Moreover, since the fastener retention tabs 68 on the retainer clip 58 are angled to extend in the aft direction (i.e., extending back toward the bezel 40 and away from the head of the fastener 24), they will flex around the fastener threads during assembly of the handle bezel 40 to the end gate 10, but will flex into the fastener threads to prevent removal of the handle bezel 40 if one attempts to remove it—thus effectively acting like barbs on a Christmas tree type of fastener. Unlike a Christmas tree type of fastener, though, the handle bezel 40 can be removed for service. One need only to unscrew the bottom fastener 24 to disengage it from the fastener retention tabs 68 on the retainer clip 58, and then pull on the handle bezel 40 to cause the integral tabs 46 to release from the tab slots 18.

Thus, while the handle bezel 40 can be assembled with only access to the outer surface 12, it cannot be removed without having access to the bottom fastener 24 on the inner surface 14. This ensures that the added security provided by the key cylinder 52 is not compromised.

Another step that may be included in the installation of the handle bezel 40 is to apply a double sided tape 72 (shown in FIG. 6) to portions of the inner (forward) side of the handle bezel 40. Then, when the handle bezel 40 is slid into place, the double sided tape 72 will adhere to the outer surface 12 around the perimeter of the handle opening 16, providing additional retention capability.

Even though a handle bezel and key cylinder for an end gate of a vehicle have been discussed herein, such a bezel with a retainer clip may also be employed for assembly of other bezels to other vehicle closures.

While certain embodiments of the present invention have been described in detail, those familiar with the art to which this invention relates will recognize various alternative designs and embodiments for practicing the invention as defined by the following claims.

What is claimed is:

1. A handle bezel for use on a closure of a vehicle comprising:

a bezel body having an opening adapted to receive a handle;

a retainer bracket extending outward from the bezel body and including a support flange; and a retainer clip mounted to the retainer bracket and including a main surface having a fastener opening extending therethrough, and a plurality of fastener retention tabs extending generally radially inward into the fastener opening and extending out of plane to the main surface, with the plurality of fastener retention tabs adapted to slidably engage a fastener mounted to the closure when the handle bezel is biased toward the closure and securingly engage the fastener mounted to the closure when the handle bezel is biased away from the closure; and wherein the retainer bracket includes a plurality of mounting slots within which the retainer clip is mounted, and the retainer clip includes at least one bracket retention tab operatively engaging at least one of the mounting slots.

2. The handle bezel of claim 1 wherein the closure is a vehicle end gate.

3. The handle bezel of claim 1 including a key cylinder mounted to the bezel body, with the key cylinder adapted to operatively engage a latch assembly that operatively engages the handle.

4. The handle bezel of claim 1 including a plurality of integral tabs extending from the bezel body and adapted to operatively engage respective ones of a plurality of tab slots in the closure.

5. The handle bezel of claim 4 wherein each of the integral tabs includes a respective one of a plurality of retention springs mounted thereon, with the plurality of retention springs each adapted to retain the respective integral tab in the respective tab slot.

6. The handle bezel of claim 1 including a double sided tape adhered to the bezel body and adapted to operatively engage the closure when the handle bezel is mounted to the closure.

7. A closure of a vehicle comprising:

an outer surface including a handle opening;

an inner surface in opposed relation to the outer surface;

a latch handle assembly located within the handle opening, having a handle portion, and secured to the inner surface;

a fastener extending through the inner surface and extending toward the outer surface, wherein the fastener operatively engages the latch handle assembly to secure the latch handle assembly to the inner surface; and a handle bezel including a bezel body having an opening that receives the handle portion; a retainer bracket extending outward from the bezel body; and a retainer clip mounted to the retainer bracket and including a main surface having a fastener opening extending therethrough, and a plurality of fastener retention tabs extending generally radially inward into the fastener opening and extending out of plane to the main surface, with the fastener retention tabs slidably engaging the fastener when the handle bezel is biased toward the closure and securingly engaging the fastener when the handle bezel is biased away from the closure.

8. The closure of claim 7 wherein the closure is an end gate.

9. The closure of claim 8 wherein the inner surface of the end gate has a forward side and the fastener engages the inner surface such that the fastener is removable from the forward side of the inner surface, whereby as the fastener is removed from the inner surface, the fastener retention tabs are released from the fastener.

10. The closure of claim 8 including a key cylinder mounted to the handle bezel, with the key cylinder operatively engaging the latch handle assembly.

11. The closure of claim 7 including a key cylinder mounted to the handle bezel, with the key cylinder operatively engaging the latch handle assembly.

12. The closure of claim 7 wherein the outer surface includes a plurality of tab slots adjacent to the handle opening, and the handle bezel includes a plurality of integral tabs extending from the bezel body, with each of the integral tabs operatively engaging a respective one of the tab slots.

13. The closure of claim 12 wherein each of the integral tabs includes a respective one of a plurality of retention springs mounted thereon, with each of the retention springs engaging a respective one of the tab slots.

14. A method of assembling a handle bezel to a vehicle closure having an outer surface and an inner surface, the method comprising the steps of:

(a) assembling a latch handle assembly to the vehicle closure with at least one fastener extending through the inner surface and extending toward the outer surface;

(b) slidably inserting a handle bezel through a handle opening in the outer surface around a handle portion of the latch handle assembly;

(c) slidably engaging a retainer clip mounted to the handle bezel around the fastener as the handle bezel is axially moved toward the outer surface; and (d) engaging fastener retention tabs on the fastener such that axially sliding disengagement of the retainer clip from the fastener is prevented.

15. The method of claim 14 including the step of assembling a key cylinder to the handle bezel prior to step (c).

16. The method of claim 14 wherein step (c) is further defined by engaging a plurality of integral tabs extending from the handle bezel with a corresponding plurality of tab slots in the outer surface as the handle bezel is axial moved toward the outer surface.

17. The method of claim 16 including the steps of mounting a respective one of a plurality of retention springs on each of the integral tabs, and biasingly engaging each of the retention springs in a respective one of the tab slots.

18. The method of claim 14 including the step of mounting a double sided tape to one of the outer surface and the handle bezel and engaging the double sided tape to the other of the outer surface and the handle bezel as the handle bezel is axially moved toward the outer surface.

19. A closure of a vehicle comprising:

an outer surface including a handle opening;

an inner surface in opposed relation to the outer surface;

a latch handle assembly located within the handle opening, having a handle portion, and secured to the inner surface;

a fastener extending through the inner surface and extending toward the outer surface; and a handle bezel including a bezel body having an opening that receives the handle portion; a retainer bracket extending outward from the bezel body; and a retainer clip mounted to the retainer bracket and including a main surface having a fastener opening extending therethrough, and a plurality of fastener retention tabs extending generally radially inward into the fastener opening and extending out of plane to the main surface, with the fastener retention tabs slidably engaging the fastener when the handle bezel is biased toward the closure and securingly engaging the fastener when the handle bezel is biased away from the closure;

wherein the closure is an end gate, and wherein the inner surface of the end gate has a forward side and the fastener engages the inner surface such that the fastener is removable from the forward side of the inner surface, whereby as the fastener is removed from the inner surface, the fastener retention tabs are released from the fastener.

20. A closure of a vehicle comprising:

an outer surface including a handle opening;

an inner surface in opposed relation to the outer surface;

a latch handle assembly located within the handle opening, having a handle portion, and secured to the inner surface;

a fastener extending through the inner surface and extending toward the outer surface; and a handle bezel including a bezel body having an opening that receives the handle portion; a retainer bracket extending outward from the bezel body; and a retainer clip mounted to the retainer bracket and including a main surface having a fastener opening extending therethrough, and a plurality of fastener retention tabs extending generally radially inward into the fastener opening and extending out of plane to the main surface, with the fastener retention tabs slidably engaging the fastener when the handle bezel is biased toward the closure and securingly engaging the fastener when the handle bezel is biased away from the closure;

wherein the closure is an end gate, and wherein the end gate includes a key cylinder mounted to the handle bezel, with the key cylinder operatively engaging the latch handle assembly.

* * * * *